United States Patent
Pandya et al.

(10) Patent No.: US 11,833,690 B2
(45) Date of Patent: Dec. 5, 2023

(54) ROBOTIC SYSTEM WITH DYNAMIC MOTION ADJUSTMENT MECHANISM AND METHODS OF OPERATING SAME

(71) Applicant: MUJIN, Inc., Tokyo (JP)

(72) Inventors: Aditi Pandya, Tokyo (JP); Shunichi Nozawa, Tokyo (JP); Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 193 days.

(21) Appl. No.: 17/141,186

(22) Filed: Jan. 4, 2021

(65) Prior Publication Data

US 2021/0205992 A1    Jul. 8, 2021

Related U.S. Application Data

(60) Provisional application No. 62/957,282, filed on Jan. 5, 2020.

(51) Int. Cl.
*B25J 9/16* (2006.01)

(52) U.S. Cl.
CPC .................. *B25J 9/1664* (2013.01)

(58) Field of Classification Search
CPC ............. G05B 2219/39243; B25J 13/00
See application file for complete search history.

(56) References Cited

U.S. PATENT DOCUMENTS

| 10,035,266 B1 | 7/2018 | Kroeger |
| 2014/0297031 A1 | 10/2014 | Iwasaki |
| 2017/0203446 A1* | 7/2017 | Dooley .................. H04N 23/63 |
| 2018/0009106 A1 | 1/2018 | Linlor |
| 2019/0261565 A1* | 8/2019 | Robertson ................ B25J 11/00 |
| 2022/0032460 A1* | 2/2022 | Hosomi ................. B25J 9/1607 |

FOREIGN PATENT DOCUMENTS

| CN | 104684695 A | 6/2015 |
| CN | 108724189 A | 11/2018 |
| CN | 110494259 A | 11/2019 |
| CN | 113365787 A | 9/2021 |
| JP | 2009178835 A | 8/2009 |
| JP | 2013013948 A | 1/2013 |
| JP | 2014193520 A | 10/2014 |
| JP | 2015047649 A | 3/2015 |
| JP | 2016043439 A | 4/2016 |
| JP | 6508691 B1 | 5/2019 |

(Continued)

OTHER PUBLICATIONS

ISA/KR International Search Report and Written Opinion dated Apr. 19, 2021 for PCT/US2021/012121 filed Jan. 4, 2021, 8 pages.

(Continued)

*Primary Examiner* — Abby Y Lin
*Assistant Examiner* — Dylan Brandon Mooney
(74) *Attorney, Agent, or Firm* — Perkins Coie LLP

(57) ABSTRACT

A system and method for operating a robotic system to dynamically adjust a planned trajectory or a planned implementation thereof is disclosed. The robotic system may derive updated waypoints to replace planned waypoints of the planned trajectory for implementing a task. Using the updated waypoints, the robotic system may implement the task differently than initially planned according to the planned trajectory.

20 Claims, 7 Drawing Sheets

(56) References Cited

FOREIGN PATENT DOCUMENTS

| JP | 6577686 B | | 9/2019 |
|---|---|---|---|
| JP | 2020062740 A | * | 4/2020 |
| KR | 1020150126482 A | | 11/2015 |
| WO | 2016103297 A1 | | 6/2016 |

OTHER PUBLICATIONS

CNIPA Office Action for Chinese patent application No. 202110650731.0 dated Jun. 29, 2022, 15 pages.
Office Action dated Jan. 5, 2022 for Japanese patent application No. 2021-516567, 15 pages.
Office Action dated Apr. 1, 2022 for Japanese patent application No. 2021-516567, 15 pages.
Decision of Rejection dated May 19, 2022 for Japanese patent application No. 2021-516567, 15 pages.
Decision to Grant dated Oct. 4, 2022 for Japanese patent application No. 2021-516567, 3 pages.
CNIPA Office Action for Chinese patent application No. 202110650731.0 dated Sep. 20, 2022, 5 pages.
CNIPA Office Action for Chinese patent application No. 202110650731.0 dated Nov. 23, 2022, 5 pages.

* cited by examiner

ROBOTIC SYSTEM WITH DYNAMIC MOTION ADJUSTMENT MECHANISM AND METHODS OF OPERATING SAME

CROSS-REFERENCE TO RELATED APPLICATION(S)

This application claims the benefit of U.S. Provisional Patent Application Ser. No. 62/957,282, filed Jan. 5, 2020, which is incorporated by reference herein in its entirety.

TECHNICAL FIELD

The present technology is directed generally to robotic systems and, more specifically, to systems, processes, and techniques for dynamically adjusting upcoming robotic action(s).

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

However, despite the technological advancements, robots often lack the sophistication necessary to duplicate human sensitivity and/or adaptability required for executing more complex and intricate tasks. For example, robots often lack the granularity of control and flexibility to dynamically (e.g., during execution of an on-going operation/task) adjust upcoming actions scheduled for the robots, such as in response to real-world conditions and/or dynamic changes thereto. Accordingly, there remains a need for improved techniques and systems for controlling and managing various aspects of the robots to complete the tasks despite the various real-world factors.

DETAILED DESCRIPTION

Figure 1:
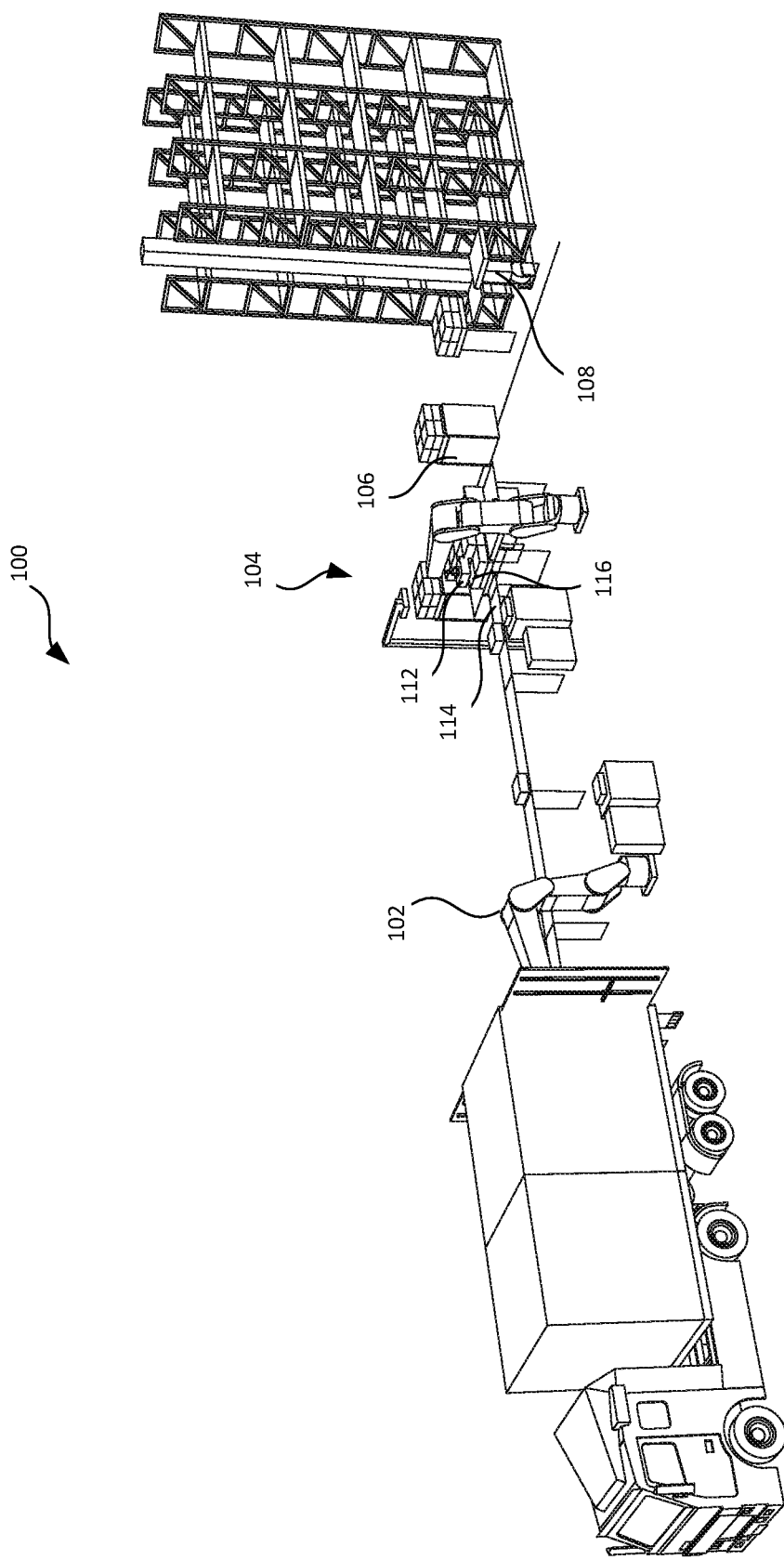
FIG. 1 is an illustration of an example environment in which a robotic system with a dynamic motion adjustment mechanism may operate.

Systems and methods for robotic systems with dynamic motion adjustment mechanisms are described herein. A robotic system (e.g., an integrated system of devices that executes one or more designated tasks) configured in accordance with some embodiments provides reduced resource consumption, reduced task completion duration, increased efficiency, reduced error rates, etc. based on dynamically adjusting upcoming robotic actions according to real-world conditions or dynamic changes thereto.

Some conventional systems use offline packing simulators to predetermine packing sequences/arrangements. The traditional packing simulators process object information (e.g., case shapes/sizes) for a predetermined or estimated set of cases to generate packing plans. Once determined, the packing plans dictate and/or require specific placement locations/poses of the objects at destinations (e.g., pallets, bins, cages, boxes, etc.), predefined sequences for the placement, and/or predetermined motion plans. From the predetermined packing plans, the packing simulators may derive source requirements (e.g., sequences and/or placements for the objects) that match or enable the packing plans.

When the packing plans are developed offline, the plans are independent of actual packing operations/conditions, object arrivals, and/or other system implementations. Accordingly, the overall operation/implementation will require the received packages (e.g., at the starting/pickup location) to follow fixed sequences that match the predetermined packing plans. As such, systems cannot adapt to real-time conditions and/or deviations in the received packages (e.g., different sequence, location, and/or orientation), unanticipated errors (e.g., collisions, lost pieces, and/or disparate packaging conditions), real-time packing requirements (e.g., received orders), and/or other real-time factors during implementation of the packing plans that are developed offline.

In contrast to the conventional systems, the robotic system described herein can dynamically adjust the packing plans, the corresponding motions plans, and/or implementations thereof according to the real-time factors. As an illustrative example, the robotic system can implement a planned trajectory (e.g., a motion plan) using a robotic unit (e.g., a transfer unit, such as a robotic arm). The planned trajectory can include planned waypoints that define the locations targeted during movement of an object.

The robotic system can track a progress along the planned trajectory and dynamically adjust upcoming robotic actions (e.g., speeds, settings, states, etc.) that correspond to one or more remaining portions of the planned trajectory. To update, the robotic system can derive a new set of updated waypoints to replace the planned waypoints. The updated waypoints can be on or along the planned trajectory and correspond to dynamic adjustments to the implementation of the task, such as for stopping, resuming, and/or canceling movement of the robot and the target object held/carried by the robot and/or for adjusting a rate of movement for the robot and the target object.

In some embodiments, the robotic system can derive a feasibility region along the planned trajectory in response to an input/output state, such as a received command, an error detection, and/or other changes in context or environment associated with the planned/implemented trajectory. The robotic system can derive the feasibility region according to a response profile (e.g., a capacity and/or a delay) of a corresponding robot (e.g., the robot implementing/following the planned trajectory). The robotic system can use the existing planned trajectory and derive one or more updated waypoints to replace the planned waypoints. A first of the updated waypoints can be derived as a location within the feasibility region according to one or more real-time parameters. Alternatively or additionally, the robotic system can iteratively update the feasibility region and the one or more real-time parameters to reach a targeted end state. Accordingly, the robotic system can dynamically adjust one or more aspects of operating the robot to implement/follow the one or more remaining portions of the planned trajectory.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a dynamic motion adjustment mechanism may operate. The robotic system 100 can include and/or communicate with one or more units (e.g., robots) configured to execute one or more tasks. Aspects of the dynamic motion adjustment mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., by operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc., corresponding to the executing task), such as to move the target object 112 from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (e.g., by moving the pallet carrying the target object 112)

from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include and/or be coupled to physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Suitable System

Figure 2:
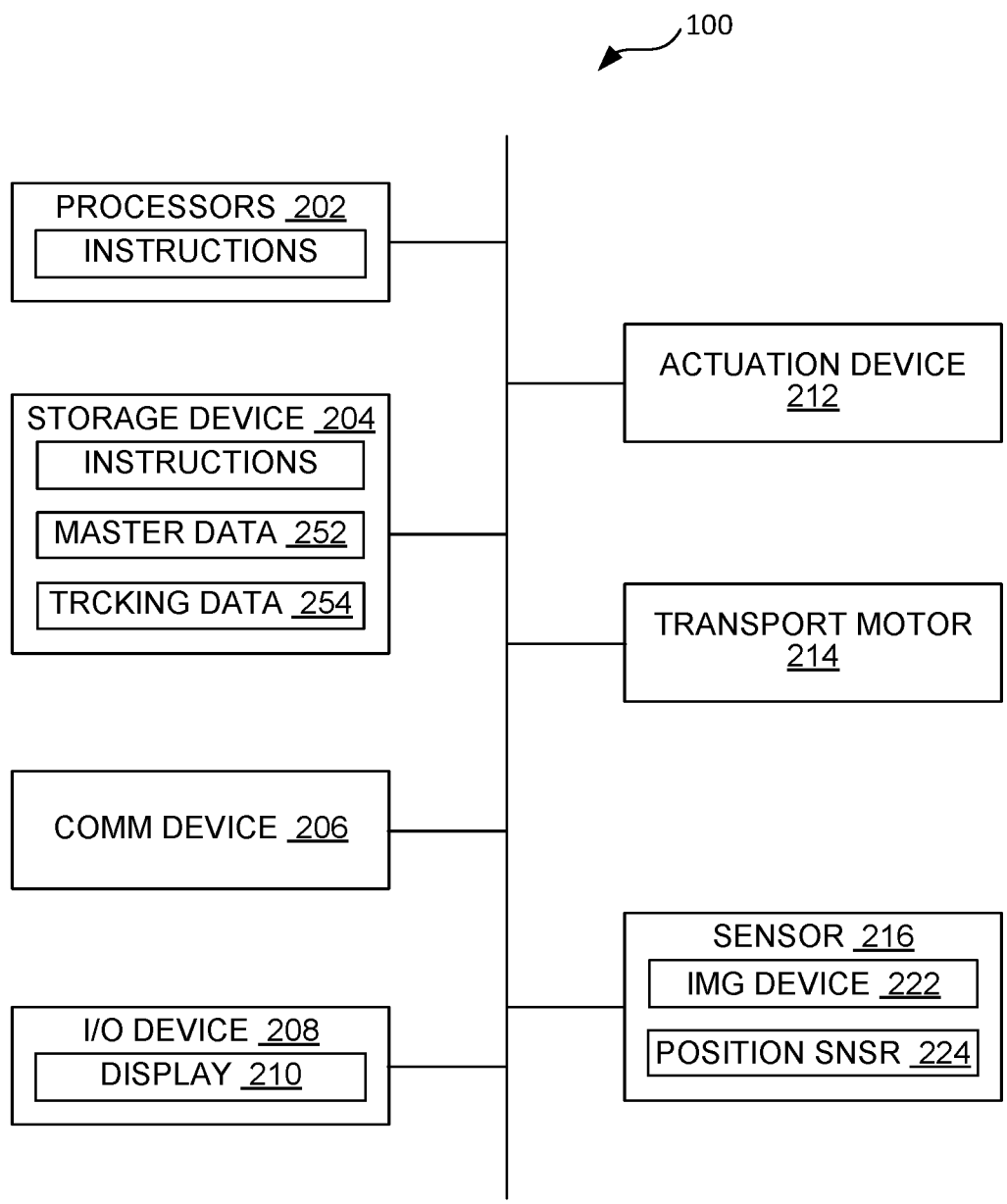
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include registration data for each such object. The registration data can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications).

For manipulating the target object 112, the robotic system 100 (e.g., via the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task. The robotic system 100 can use the detected positions, tracked locations, tracked orientations, etc. from the sensors 216 to derive tracking data 254 that represents a current and/or a set of past locations for the target object 112 of FIG. 1 and/or the structural members.

Example System Architecture

Figure 3:
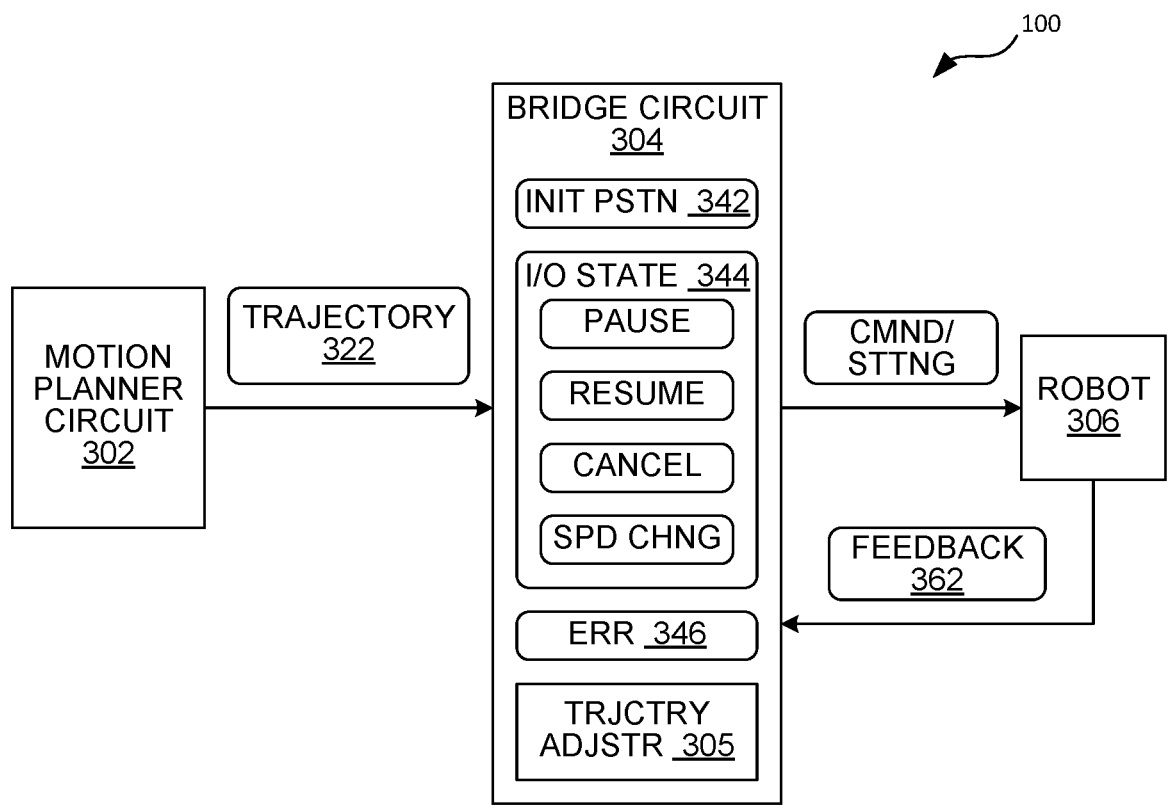
FIG. 3 is an illustration of the robotic system in accordance with one or more embodiments of the present technology.

FIG. 3 is an illustration of the robotic system 100 of FIG. 1 in accordance with one or more embodiments of the present technology. The robotic system 100 can include a motion planner circuit 302, a bridge circuit 304, and/or a robot 306.

The motion planner circuit 302 (e.g., one or more of the processors 202 of FIG. 2 and/or a circuit corresponding to a separate device/encasing) can be configured to derive planned trajectories 322 for operating the robot 306 to implement corresponding tasks. For example, each planned trajectory 322 can be for operating the robot 306 (e.g., the transfer unit 104 of FIG. 1) to manipulate or move the corresponding target object 112 of FIG. 1 from the start location 114 of FIG. 1 to the task location 116 of FIG. 1. In some embodiments, the motion planner circuit 302 can obtain and process the data from the imaging device 222 of FIG. 2 to identify and locate the target object 112 and the task location 116. The motion planner circuit 302 can derive the planned trajectory 322 based on iteratively deriving path segments for the target object 112 from the task location 116 to the start location 114. The motion planner circuit 302 can derive the path segments and the corresponding planned trajectory 322 according to predetermined rules and/or processes. The planned trajectory 322 can represent a path or a set of segments, a speed, a set of maneuvers, or a combination thereof followed by the target object 112 and/or one or more robotic components (e.g., an end-effector and/or a robotic arm) to accomplish the corresponding task. The motion planner circuit 302 can communicate the planned trajectory 322 to the bridge circuit 304. For example, the motion planner circuit 302 can send to the bridge circuit 304 a command trajectory that represents the movements to be executed by the robot 306 to accomplish the corresponding task.

The bridge circuit 304 (e.g., one or more of the processors 202) can be configured to interact with the robot 306 in implementing the planned trajectory 322. In some embodiments, the bridge circuit 304 can be implemented as a robotic system controller that coordinates/controls actions for multiple robots (e.g., robots within a warehouse or a shipping hub) to control and implement operations that each include a linked sequence of separate tasks that are executed by/across a set of robots. Accordingly, the bridge circuit 304 can control timings for the robot 306 to implement various portions/aspects of the planned trajectory 322.

The robot 306 can be configured to implement the planned trajectory 322 and execute corresponding tasks according to commands and/or settings (e.g., representations of the planned trajectory 322 or portions thereof) from the bridge circuit 304. For example, the robot 306 can operate the actuation devices 212 of FIG. 2 and/or the transport motor 214 of FIG. 2 to maneuver a robotic arm and/or an end-effector to grip, transfer, and or release the target object 112. As an illustrative example, the robot 306 can follow the planned trajectory 322 and move the robotic arm to place the end-effector at a gripping location about the target object 112 at the start location 114. After gripping the target object 112 via the end-effector at the gripping location, the robot 306 can transfer the target object 112 according to a path, a speed, a set of maneuvers, etc. that correspond(s) to the planned trajectory 322.

In implementing the planned trajectory 322, the bridge circuit 304 and the robot 306 can iteratively communicate with each other to accomplish the task. For example, the bridge circuit 304 can determine an initial position 342 of the robot 306 (e.g., real-time location(s) of a robotic arm, an end-effector, a portion thereof, or a combination thereof) and/or the transferred target object 112. The bridge circuit 304 can determine the initial position 342 before implementation of the planned trajectory 322 based on the outgoing communications (e.g., commands, settings, etc.) and/or feedback data 362 from the robot 306. As an illustrative example, the bridge circuit 304 can derive the initial position 342 using a dead reckoning mechanism and according to previously executed/implemented commands, settings, motion plans, etc. Additionally or alternatively, the bridge circuit 304 can determine the initial position 342 based on robot-tracked/reported position included in the feedback data 362. The bridge circuit 304 can similarly determine and track real-time position of the robot 306, a portion thereof, and/or the target object 112 during implementation of the planned trajectory 322.

Also, the bridge circuit 304 can track one or more input/output (I/O) states 344 for implementing the planned trajectory 322. The I/O states 344 can represent operating states of the robot 306 and/or the corresponding progress/state associated with implementing the planned trajectory 322. For example, the I/O states 344 can include pause, resume, and/or cancel states in implementing the planned trajectory 322. Also, the I/O states 344 can include a speed change state for adjusting a speed or a movement rate initially associated with the planned trajectory 322. The speed change state can include communication of commands/settings associated with the speed change, derivation of updated speed, and/or transition between the speed settings. Details regarding the speed change are described below.

The bridge circuit 304 can further track an error state 346 associated with implementation of the planned trajectory 322. For example, the bridge circuit 304 can track the error state 346 based on the feedback data 362 reporting robot-detected errors (e.g., piece-loss status). Also, the bridge circuit 304 can determine the error state 346 based on comparing the reported data (e.g., the feedback data 362) to the expected status/progress of the planned trajectory 322 and/or an update thereof (e.g., the speed change).

The bridge circuitry 304 can include a trajectory adjuster 305. The trajectory adjuster 305 can include one or more circuits and/or functions configured to adjust the planned trajectory 322 and/or an implementation thereof. The trajectory adjuster 305 can track the I/O state 344, the error state 346, grip strength or status, package identification information or status, real-time conditions at one or more points along the planned trajectory 322, and/or other real-time parameters during implementation of the planned trajectory 322. When the tracked information deviates from operating conditions and/or matches an adjustment condition, the trajectory adjuster 305 can dynamically adjust the planned trajectory 322. In some embodiments, the trajectory adjuster 305 can use the planned trajectory 322, thereby retaining the planned path of travel, and dynamically update/replace one or more waypoints therein to adjust the implementation of the planned trajectory 322. Details regarding the dynamic adjustments are described below.

Example Task Execution

Figure 4:
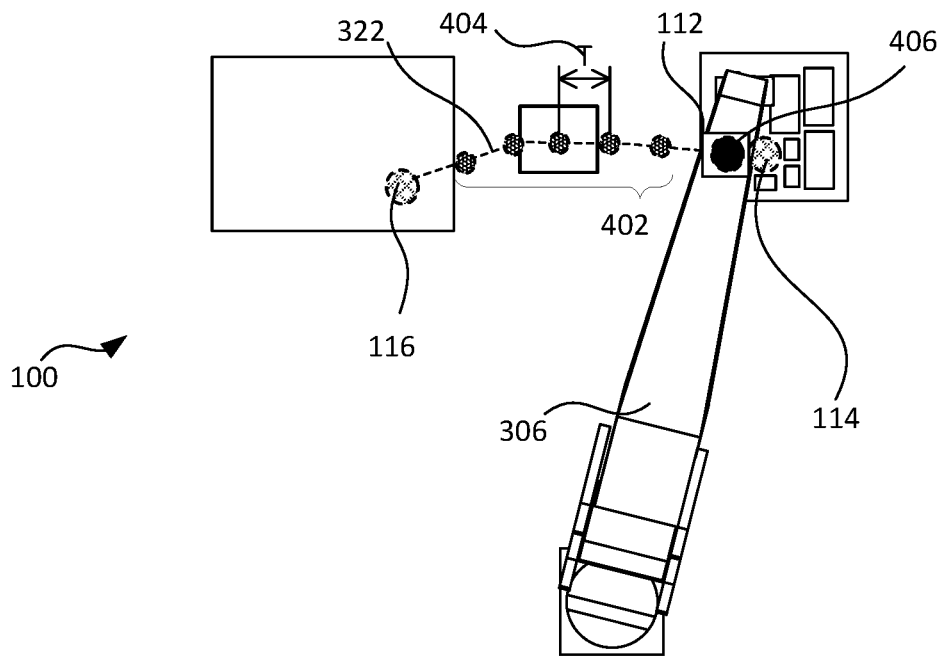
FIG. 4 is a top view of the robotic system executing an example task in accordance with one or more embodiments of the present technology.

FIG. 4 is a top view of the robotic system 100 executing an example task in accordance with one or more embodiments of the present technology. The illustrated example task can include transferring the target object 112 from the start location 114 to the task location 116. As described above, the motion planner circuit 302 of FIG. 3 can derive the planned trajectory 322 for implementing the task.

In some embodiments, the planned trajectory 322 can include one or more planned waypoints 402. The planned waypoints 402 can include targeted locations along the planned trajectory 322 according to one or more system or robot operating parameters. For example, the planned waypoints 402 can represent targeted locations for a tracked member (e.g., one or more portions of the robot 306, such as the end-effector, and/or the target object 112) corresponding to each processing period 404 (T). In other words, the bridge circuit 304 of FIG. 3 and/or the robot 306 can iteratively move the tracked member to the next planned waypoint during each processing period. In one or more embodiments, the movement of the tracked member can be linear and/or at constant speed between a pair of the planned waypoints 402. The planned waypoints 402 can represent locations for changing movement of the tracked member, such as by changing a direction or a speed of the movement or by rotating the tracked member.

As an illustrative example, the robotic system 100 (via, e.g., the bridge circuit 304) can track a current location 406 of the tracked member. The robotic system 100 can track the current location 406 while the robot 306 transfers the target object 112 during and/or between implementations of the tasks and the corresponding planned trajectories. Accordingly, the bridge circuit 304 can know the current location 406 of the end-effector when the planned trajectory 322 for a new task is received. The bridge circuit 304 can set the current location 406 as the initial position 342 of FIG. 3. Accordingly, the bridge circuit 304 can send data and/or commands to the robot 306 to implement the planned trajectory 322. For example, the bridge circuit 304 can send the data and/or commands to the robot 306 for iteratively moving the tracked portion to the next one of the planned waypoints 402 over each processing period 404.

During implementation of the planned trajectory 322, the robotic system 100 can monitor real-time conditions. Some examples of the real-time conditions can include error conditions that represent piece-loss (e.g., dropping the target object 112), insufficient grip on the target object 112, unexpected/unplanned contact between the robot 306 and/or the target object 112 with another object/structure (e.g., collision event), predetermined cancelling conditions, mismatching sensor values, unexpected conditions at starting/ending locations, operating and/or mechanical failures at the robot 306, and the like. Other examples of the real-time conditions can include commands provided by other devices/systems, such as pause, resume, cancel, and/or speed adjustment commands from external sources (e.g., the motion planner circuit 302 of FIG. 3) and/or internal sources (e.g., the trajectory adjuster 305 of FIG. 3). The bridge circuit 304 can detect and set the I/O state 344 of FIG. 3 and/or error state 346 of FIG. 3 based on monitoring the real-time conditions.

For each processing period 404, the bridge circuit 304 and/or the robot 306 can check the I/O state 344. When the I/O state 344 indicates continued implementation of the planned trajectory 322 (e.g., the resume state and/or the absence of pause/cancel/speed change), the bridge circuit 304 and/or the robot 306 can operate to advance the tracked portion (e.g., the end-effector and/or the target object 112) to the next one of the planned waypoints 402. The bridge circuit 304 and/or the robot 306 can continue to check for error conditions while advancing the tracked portion to the next waypoint. When an error condition is detected and the error state 346 is set/detected, the bridge circuit 304 can reverse, cancel, adjust, and/or restart implementation of the planned trajectory 322. In reversing, canceling, etc. for the planned trajectory 322, the bridge circuit 304 (via, e.g., the trajectory adjuster 305) can adjust the movement speed and/or the waypoints. Accordingly, the bridge circuit 304 can implement the changes to the planned trajectory 322 in a smooth/seamless manner to reduce sudden movements/impacts that lead to other failures and/or according to hardware/physical capacities of the robot 306.

Figure 5A:
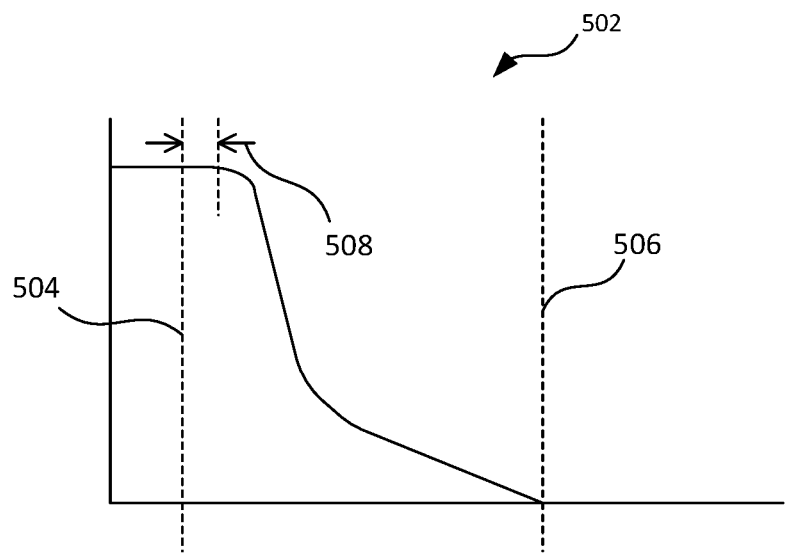
FIG. 5A is an illustration of a response profile in accordance with one or more embodiments of the present technology.

FIG. 5A is an illustration of a response profile 502 in accordance with one or more embodiments of the present technology. The response profile 502 can represent a physical reaction or implementation at the robot 306 in carrying out a command. For the example illustrated in FIG. 5A, the response profile 502 can represent a speed of the end-effector in response to a stop command or a pause state. The vertical axis can represent a speed of the end-effector and the horizontal axis can represent time. The response profile 502 can represent a triggering event 504, such as the stop command/pause state being received at the robot 306, and a corresponding response of the robot 306. The robot 306 can respond to the triggering event 504 and implement a completing event, such as by stopping movement of the end-effector. The robot 306 may require a robot processing delay 508 to receive and process the triggering event 504. Subsequent to the triggering event 504 and/or the processing thereof, the robot 306 can implement the physical changes, such as by slowing down movement of the end-effector, to achieve the completing event 506.

The robotic system 100 (e.g., the bridge circuit 304) can use the response profile 502 to adjust implementation of the planned trajectory 322. In other words, the robotic system 100 can account for the physical or performative characteristics of the robot 306 in adjusting the implementation of the planned trajectory 322. In some embodiments, the robotic system 100 can use the response profile 502 to derive updated waypoints that replace the planned waypoints 402.

Figure 5B:
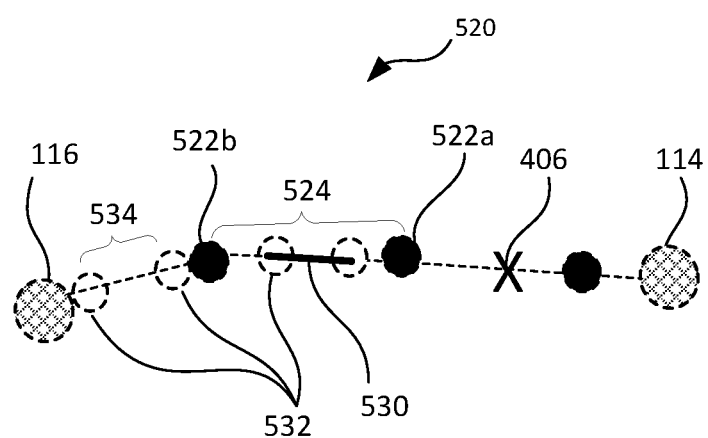
FIG. 5B is an illustration of an example adjustment in accordance with one or more embodiments of the present technology.

FIG. 5B is an illustration of an example adjustment 520 in accordance with one or more embodiments of the present technology. As illustrated in FIG. 5, the robotic system 100 of FIG. 1 (via, e.g., the bridge circuit 304 of FIG. 3 and/or the robot 306 of FIG. 3) can implement the planned trajectory 322 of FIG. for transferring the target object 112 from the start location 114 to the task location 116. During the implementation, the robotic system 100 can track the current location 406 of a target portion (e.g., the end-effector and/or the target object 112 of FIG. 1).

When the robotic system 100 determines a state change, such as in the I/O state 344 of FIG. 3 and/or the error state 346 of FIG. 3, the robotic system 100 can determine one or more active waypoints 522 (e.g., a first upcoming point 522a and/or a second upcoming point 522b) among the planned waypoints 402. The active waypoints 522 can include instances of the planned waypoints 402 that are beyond or upcoming relative to the current location 406 and exclude instances of the planned waypoints 402 that have passed or that have been traversed by the target portion (e.g., waypoints behind the current location 406). In some embodiments, the robotic system 100 can operate the robot 306 to iteratively move a representative portion thereof (e.g., the end-effector) and/or the target object 112 along planned segments 524 that extend between adjacent ones of the planned waypoints 402.

Further, in response to the determined state change, the robotic system 100 can access and/or analyze the response profile 502 of FIG. 5 that correspond to the state change. For example, the robotic system 100 (e.g., the bridge circuit 304) can determine the capacity of the robot 306 to execute and complete the action that correspond to the state change. Accordingly, the robotic system 100 can derive a feasibility region 530 that represent locations along the planned trajectory 322 where the adjustment action (e.g., the action taken in response to the state change) may be completed. The feasibility region 530 can represent closest/earliest location and/or farthest/latest location along the planned trajectory 322 where the adjustment action may be completed (e.g., where the adjustment can begin or first take effect).

The robotic system 100 (e.g., the trajectory adjuster 305 of FIG. 3) can derive one or more updated waypoints 532 based on the feasibility region 530. The updated waypoints 532 can be along the planned trajectory 322. The updated waypoints 532 can be for replacing the planned waypoints 402. One or more of the updated waypoints 532 may coincide with corresponding one or more of the planned waypoints 402. In some embodiments, the robotic system 100 can operate the robot 306 to iteratively move the representative portion thereof (e.g., the end-effector) and/or the target object 112 along updated segments 534 that extend between adjacent ones of the updated waypoints 532.

The robotic system 100 can derive one or more of the updated waypoints 532 within the feasibility region 530. The robotic system 100 can initiate the adjustment action at the current location 406 such that the tracked portion can complete the adjustment action at the next updated waypoint (e.g., the waypoint within the feasibility region 530. As an illustrative example, the robotic system 100 can stop the end-effector and/or the carried target object 112 at the next updated waypoint. Also, the robotic system 100 can achieve a targeted speed (e.g., an increase or a decrease in the movement speed in comparison to the planned speed) by the next updated waypoint. The robotic system 100 can use multiple updated waypoints 532 to achieve a desired end state, such as by iteratively increasing or decreasing the movement speed. In deriving the updated waypoints 532, the robotic system 100 can account for the updated movement speeds. The processing period 404 of FIG. 4 can remain constant, and the updated waypoints 532 can correspond to the updated movement speeds with respect to the constant processing period 404. For example, the distance/separation between the updated waypoints 532 can decrease in comparison to the planned waypoints 402 when the updated movement speeds are slower.

In some embodiments, the response profile 502 can correspond to (1) a maximum reverse velocity of the robot 306 (e.g., a maximum negative change in movement speed during one processing period 404 or a remaining portion thereof) and (2) a maximum forward velocity of the robot 306 (e.g., a maximum positive change in movement speed during one processing period 404 or a remaining portion thereof). The maximum reverse velocity can be represented as $\dot{q}^-$, and the maximum forward velocity can be represented as $\dot{q}^+$. A position of the representative portion can be denoted q, a corresponding velocity (e.g., a first derivative of the position) can be denoted $\dot{q}$, and a corresponding acceleration (e.g., a second derivative of the position) can be denoted $\ddot{q}$. An initial position/waypoint for a current segment (e.g., the segment containing the current location 406) can be denoted $q_i$.

The feasibility region 530 can be defined by (1) a reverse boundary and (2) a forward boundary both relative to an upcoming planned waypoint (e.g., the first upcoming point 522a). The reverse boundary can be derived according to the maximum reverse velocity ($\dot{q}^-$), the upcoming planned waypoint ($q_{i+1}$), and the processing period 404 (T). For example, the reverse boundary can be derived based on $q_{i+1}+T*\dot{q}^-$. The forward boundary can be derived according to the maximum reverse velocity ($\dot{q}^+$), the upcoming planned waypoint ($q_{i+1}$), and the processing period 404 (T). For example, the forward boundary can be derived based on $q_{i+1}+T*\dot{q}^+$.

The robotic system 100 can derive a first of the updated waypoints 532 to be located within the feasibility region 530. In deriving the first updated waypoint, the robotic system 100 can determine a targeted speed. The targeted speed can be bounded by the maximum reverse velocity ($\dot{q}^-$) and the maximum forward velocity ($\dot{q}^+$). In some embodiments, the targeted speed can be derived based on evaluating a difference between an initial position for next segment (e.g., the first upcoming point 522a) and an initial position for second subsequent segment (e.g., the second upcoming point 522b) over the processing period 404 (T). Accordingly, the targeted speed can be represented as $\dot{q}^- \leq q_{i+2}-q_{i+1}/T \leq \dot{q}^+$, where the initial position of the next segment is denoted $q_{i+1}$ and the initial position for second subsequent segment is denoted $q_{i+2}$. When the response command extends beyond the feasibility region 530, the first updated waypoint can be truncated or adjusted to be within the feasibility region 530, such as at a boundary thereof. The first of the updated waypoints 532 can be derived based on implementing the targeted speed and/or corresponding acceleration over one processing period.

In one or more embodiments, the robotic system 100 can calculate one or more intermediate speeds between a current/planned speed and the targeted speed. The robotic system 100 can calculate the intermediate speeds according to the maximum forward/reverse velocity or accelerations when the targeted speeds is unattainable within one processing period. Accordingly, the robotic system 100 iteratively implement and reach intermediate speeds over multiple processing periods/waypoints and up to the targeted speed. The robotic system 100 can derive the updated waypoints 532 according to the intermediate/targeted speed and/or the corresponding accelerations over each corresponding processing period.

Example Control Flow

Figure 6:
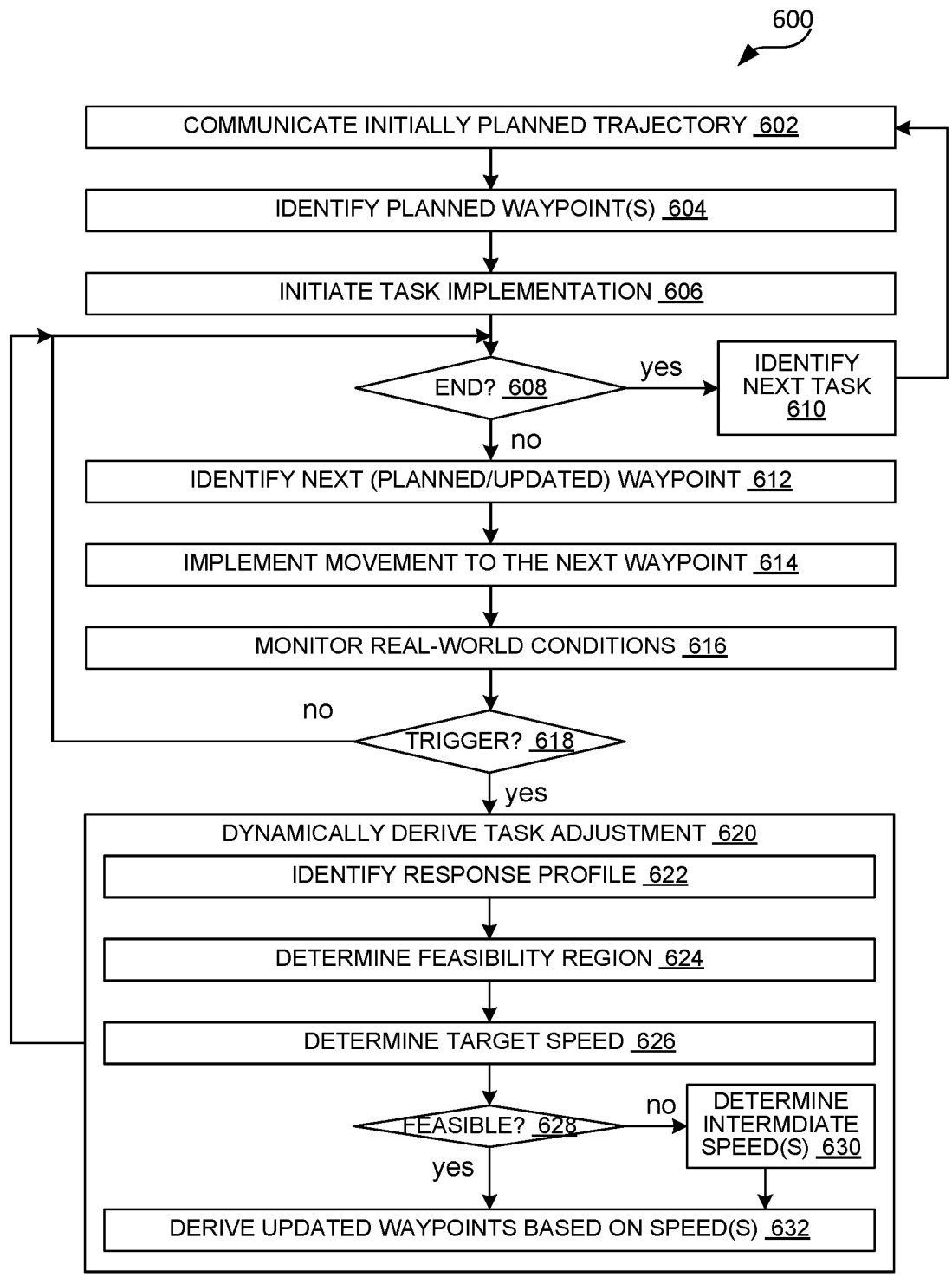
FIG. 6 is a flow diagram for an example method of operating the robotic system of FIG. 1 in accordance with one or more embodiments of the present technology.

FIG. 6 is a flow diagram for an example method 600 of operating the robotic system 100 of FIG. 1 in accordance with one or more embodiments of the present technology. The method 600 can be for dynamically adjusting (e.g., after derivation of and/or during implementation of) the planned trajectory 322 of FIG. 3 or an implementation thereof. The method 600 can be implemented using the bridge circuit 304 of FIG. 3, the motion planner circuit 302 of FIG. 3, and/or the robot 306 of FIG. 3. The method 600 can be implemented based on executing the instructions stored on one or more of the storage devices 204 of FIG. 2 with one or more of the processors 202 of FIG. 2. The method 600 can be implemented based on communicating the planned trajectory 322, the adjustment 520 of FIG. 5B, the feedback data 362 of FIG. 3, and/or corresponding commands/settings using the communication device 206. The communicated commands/settings can be executed at the robot 306, thereby implementing the task that corresponds to the planned trajectory 322 and/or the adjustment 520 thereto. In some embodiments, the method 600 can be implemented using one or more state machines.

At block 602, the robotic system 100 can communicate an initially planned trajectory configured to carry out a task. For example, the motion planner circuit 302 can derive the planned trajectory 322 for accomplishing a task that requires manipulation of the target object 112 of FIG. 1, such as for transferring the target object 112 from the start location 114 of FIG. 1 to the task location 116 of FIG. 1. In some embodiments, the motion planner circuit 302 can derive the planned trajectory 322 by determining a targeted pose for the target object 112 at the task location 116 and iteratively determining path segments that connect to the start location 114.

The motion planner circuit 302 can communicate the derived planned trajectory 322 to the bridge circuit 304, and the bridge circuit 304 can receive the initially planned trajectory 322. As described in further detail below, the bridge circuit 304 can control implementation of the task and/or real-time/dynamic adjustments to the task.

At block 604, the robotic system 100 can identify one or more planned waypoints 402 of FIG. 4 associated with the planned trajectory 322. The planned waypoints 402 can include locations along the planned trajectory 322 iteratively/incrementally targeted for a set of processing periods 404 of FIG. 4. In other words, the robotic system 100 can operate the robot 306 to place the representative portion (e.g., the end-effector) and/or the target object 112 at the planned waypoints 402 at the end of corresponding processing periods 404. In some embodiments, identifying the planned waypoints 402 can include the bridge circuit 304 accessing the planned waypoints 402 derived at the motion planner circuit 302 and included in from the received information. In other embodiments, identifying the planned waypoints 402 can include the bridge circuit 304 determining locations along the planned trajectory 322 according to the processing period 404 (e.g., the preset duration for each period) and the speed setting associated with the planned trajectory 322 (e.g., information provided along with the planned trajectory 322).

At block 606, the robotic system 100 can initiate task implementation. For example, the robotic system 100 can initiate the task implementation based on the bridge circuit 304 communicating commands/settings to the robot 306 to begin the task execution process, initiate corresponding protocol, etc. The bridge circuit 304 can further determine the initial position 342 of FIG. 3 of the robot 306, such as the representative portion thereof (e.g., the end-effector) and/or operate the robot 306 to maneuver the representative portion to a predetermined location (e.g., a gripping location identified by the planned trajectory 322 for grasping the target object 112). Upon completion of the maneuver, the predetermined location can serve as the initial position 342.

At decision block 608, the robotic system 100 can determine whether the implementation of the task has reached an end (e.g., a termination state corresponding to the target object 112 being placed at the task location 116) according to the planned trajectory 322. As described in detail below, the robotic system 100 can iteratively transfer the target object 112 along the planned trajectory 322. The robotic system 100 can determine whether the implementation of the task has reached the end for each movement iteration. In some embodiments, the robotic system can determine that the task has reached the end when the target object 112 is placed at the task location 116 and/or when all commands/settings that corresponded to the planned trajectory 322 have been executed/completed. When the task has reached the end, the robotic system 100 can identify the next task as represented in block 610 and communicate the corresponding next planned trajectory as illustrated by the feedback loop to block 602.

When the task has not reached the end, the robotic system 100 can identify a next waypoint as illustrated in block 612. The robotic system 100 (e.g., the bridge circuit 304) can identify the next waypoint based on comparing the current location 406 (e.g., the initial position 342 for the first iteration) to the currently maintained/valid set of waypoints. The maintained/valid set of waypoints can initially include the planned waypoints 402. The maintained/valid set of waypoints can include the updated waypoints 532 of FIG. 5B instead of the planned waypoints 402 after or based on the adjustment 520. Based on the comparison, the robotic system 100 can identify the next waypoint as the waypoint adjacent to (e.g., immediately ahead of) the current location 406 along the movement direction.

At block 614, the robotic system 100 can implement movement of the representative portion of the robot 306 and/or the target object 112 to the identified next waypoint. For example, the bridge circuit 304 can implement movement by communicating a set of commands and/or settings for operating the robot 306 to have the target object 112 or the representative portion of the robot 306 to follow the planned trajectory 322 to the next waypoint. The robot 306 can receive and execute the set of commands and/or settings to move/displace the representative portion of the robot 306 and/or the target object 112 to the identified next waypoint.

At block 616, the robotic system 100 the robotic system 100 can monitor real-world conditions during implementation of the task. For example, the robotic system 100 can receive and analyze real-time data from the sensors 216 of FIG. 2 to monitor real-world conditions. Also, the robotic system 100 can use real-time data (e.g., commands and/or other messages) from the motion planner circuit 302, the robot unit (e.g., the feedback data 362 from the robot 306), and/or other communicatively coupled devices/systems (e.g., warehouse management system) for the monitoring function.

In some embodiments, the robotic system 100 can monitor the real-world conditions based on monitoring the I/O states 344 of FIG. 3 while the representative portion and/or the target object 112 is moved to the next waypoint (e.g., during implementation of a corresponding segment movement). The I/O states 344 can correspond to the results of analyzing the real-time sensor data and/or the received communication data and represent a capacity for the robotic system 100 (e.g., the robot 306) to complete the task implementation and manipulate the target object 112. The robotic system 100 (e.g., the bridge circuit 304) can monitor the I/O state 344 by detecting a pause state, a resume state, a cancel state, a speed change state, the error state 346, and/or a change thereto.

At decision block 618, the robotic system 100 can determine whether the monitored real-world conditions match a trigger for adjusting the on-going task. The trigger can represent conditions that require changes to the task, such as conditions that correspond to one or more of the states described above. As an illustrative example, the robotic system 100 can detect and account for lower grip strengths, lost pieces, collisions, and/or other unexpected conditions that occur during implementation of the task.

When the monitored real-world conditions do not match the triggering condition, the robotic system 100 can continue to implement the task according to the initially planned trajectory 322 as represented by the feedback loop. Accordingly, the robotic system 100 can implement the processes described above for blocks 608-616 and identify the next waypoint in the planned trajectory 322 and iteratively implement the task as initially planned.

When the monitored real-world conditions match the triggering condition, the robotic system 100 can dynamically derive one or more task adjustments (e.g., the adjustment 520 of FIG. 5B) as represented in block 620. In some embodiments, the robotic system 100 can dynamically derive the adjustment 520, such as by deriving the updated waypoints 532 of FIG. 5B, based on the I/O state 344. For example, in response to detecting the pause state, the resume state, the cancel state, the speed change state, and/or the error state, the robotic system 100 can dynamically derive (e.g., during implementation of the task, such as when the representative portion of the robot 306 is between the start location 114 and the task location 116) the updated waypoints 532 along the planned trajectory 322. The updated waypoints 532 can be configured to replace the planned waypoints 402 including one or more of the upcoming/remaining waypoints. The updated waypoints 532 can correspond to the processing period 404 such that each waypoint represent a targeted location to be reached by the target object 112 or the representative portion at an end of the corresponding processing period 404.

In some embodiments, the robotic system 100 can dynamically derive the task adjustment based on identifying the response profile 502 of FIG. 5A associated with the detected trigger as illustrated in block 622. For example, the robotic system 100 can identify the response profile 502 for slowing down, speeding up, and/or stopping the movement of the representative portion for the robot 306. The robotic system 100 can identify the response profile 502 based on accessing predetermined/known information (e.g., information stored in the storage device 204 of FIG. 2, such as within the master data 252 of FIG. 2) regarding the robot 306 and/or based on communicating the profile with the robot 306. Accordingly, the robotic system 100 can identify the representative of a physical capacity of the robot to execute the adjustment or a portion thereof (e.g., speed up, slow down, stop, etc.), such as the maximum reverse velocity and/or the maximum forward velocity associated with the corresponding response profile 502.

At block 624, the robotic system 100 can determine the feasibility region 530 based on the response profile 502. The robotic system 100 (via, e.g., the bridge circuit 304) can determine the feasibility region 530 along the planned trajectory 322 and ahead of the current location 406 representative of the target object 112 and/or the representative portion of the robot 306. The robotic system 100 can determine the feasibility region 530 based on mapping the response profile 502 according to a projected timing of the updated command/setting and locations/distances extrapolated based on a speed/time from the feasibility region 530. Accordingly, the robotic system 100 can determine the feasibility region 530 based on deriving the reverse boundary and/or the forward boundary associated with the maximum reverse velocity and/or the maximum forward velocity, respectfully. The reverse boundary and the forward boundary can be used to define the feasibility region 530 (e.g., the region between the reverse and forward boundaries). The robotic system 100 can use the feasibility region 530 to identify/represent locations along the planned trajectory 322 where the adjustment 520 can first take effect.

At block 626, the robotic system 100 can determine a target speed for the detected trigger. For example, the robotic system 100 can determine the target speed as zero or stopped movement state when the monitored conditions correspond to predetermined states, such as stop, cancel, and/or reverse. Also, the robotic system 100 can determine the target speed as the speed associated with/targeted by the speed change stage and/or the reverse state (e.g., as a vector with opposite direction along the planned trajectory 322). Further, the robotic system 100 can determine the target speed according to one or more predetermined processes and/or equations in response to detection of the error state 346.

The target speed can be different from a planned speed associated with the initially planned trajectory 322 or an upcoming portion thereof. In other words, the target speed can correspond to an end state/condition for a dynamically derived adjustment to the planned trajectory 322 and/or an implementation thereof.

At decision block 628, the robotic system 100 (via, e.g., the bridge circuit 304) can determine whether a change to the target speed can be feasibly implemented over one processing period. For example, the robotic system 100 can compare the target speed and/or a difference between the current speed and the target speed to the maximum/boundary speeds associated with the response profile 502. When the target speed is not feasible within one processing period (e.g., when the target speed exceeds the maximum speed change associated with the robot 306), the robotic system 100 can determine one or more intermediate speeds as represented in block 630. In other words, the robotic system 100 can use multiple processing periods to step through the intermediate speeds and reach the target speed. In some embodiments, the robotic system 100 can determine the intermediate speed as the maximum/boundary speed nearest to the target speed. In other embodiments, the robotic system 100 can determine a minimum number of processing periods/iterations necessary to reach the target speed. The robotic system 100 can calculate the intermediate speed(s) based on dividing the target speed by the determined minimum number. The intermediate speed(s) can include values/settings between a current speed and the target speed.

At block 632, the robotic system 100 can derive updated waypoints based on the derived speed(s) (e.g., the target speed and/or the intermediate speed(s)). In some embodiments, the bridge circuit 304 can set a flag according to the feasibility determination described above. The bridge circuit 304 can use the determined speed for the first/next upcoming segment to derive a first of the updated waypoints 532. The first waypoint can be derived based on the upcoming speed bounded by the maximum speeds/adjustments associated with the response profile 502 as described above. Accordingly, the robotic system 100 can derive the first waypoint as a location within the feasibility region 530.

As an illustrative example, the robotic system 100 can determine that the change will be implemented at the next upcoming waypoint (e.g., the first upcoming waypoint 522a of FIG. 5B) ahead of the current location 406. Accordingly, the response profile 502 can be mapped to the segment following the first upcoming waypoint 522a. Since the response profile 502 describes changes that can be implemented in one processing period, the feasibility region 530 can include a subsegment between the first upcoming waypoint 522a and the second upcoming waypoint 522b of FIG. 5B. The robotic system 100 can derive the first updated waypoint as a location within the feasibility region 530, such as according to a targeted speed and/or a location closest to the targeted speed. For example, if the robot 306 can implement the desired change within the upcoming processing period, the robotic system 100 can derive the first updated waypoint based on extrapolating the implementation of the targeted adjustment (e.g., based on one or more predetermined processes that extrapolate maximum acceleration/deceleration to distance/location). If the robot 306 requires more than one processing period to implement the change, the robotic system 306 can derive the first updated waypoint as the farthest boundary of the feasibility region 530 or a divided location as described above relative to the first upcoming point 522a.

In some embodiments, the robotic system 100 can derive the remaining set of updated waypoints 532 based on the targeted speed and/or the intermediate speed(s). In other embodiments, the robotic system 100 can derive one upcoming updated waypoint per iteration.

The robotic system 100 can use the updated waypoints 532 to implement the adjustment 520 as represented by the feedback loop. Thus, based on the I/O state 344, the robotic system 100 (via, e.g., the bridge circuit 304) can implement the adjustment 520 to the task for manipulating the target object 112 according to the updated waypoints 532 and instead of the planned waypoints 402. For the remaining portions of the planned trajectory 322, the bridge circuit 304 can generate commands/settings for operating the robot 306 to target/follow the upcoming waypoints 532 instead of the planned waypoints 402 for the subsequent processing periods. Accordingly, the bridge circuit 304 can operate the robot 306 to transition from the current speed to the target movement speed across one or more updated waypoints and corresponding processing period(s). For example, when feasible, the bridge circuit 304 can operate the robot 306 to transition from the current speed to the target speed during an initial processing period following the detected trigger condition/state. Also, if not feasible over one period/iteration, the bridge circuit 304 can operate the robot 306 to transition from the current speed to the intermediate speed during the initial processing period. The bridge circuit 304 can operate the robot 306 transition from the intermediate speed to the target speed during a subsequent processing period. The bridge circuit 304 can iteratively move the target object 112 and/or the representative portion to implement the task and the subsequent adjustment 520 thereto. Accordingly, the bridge circuit 304 can operate the robot 306 to stop, reverse, and/or adjust speed for moving the target object 112 and/or the representative portion.

Example Implementation Details

Figure 7A:
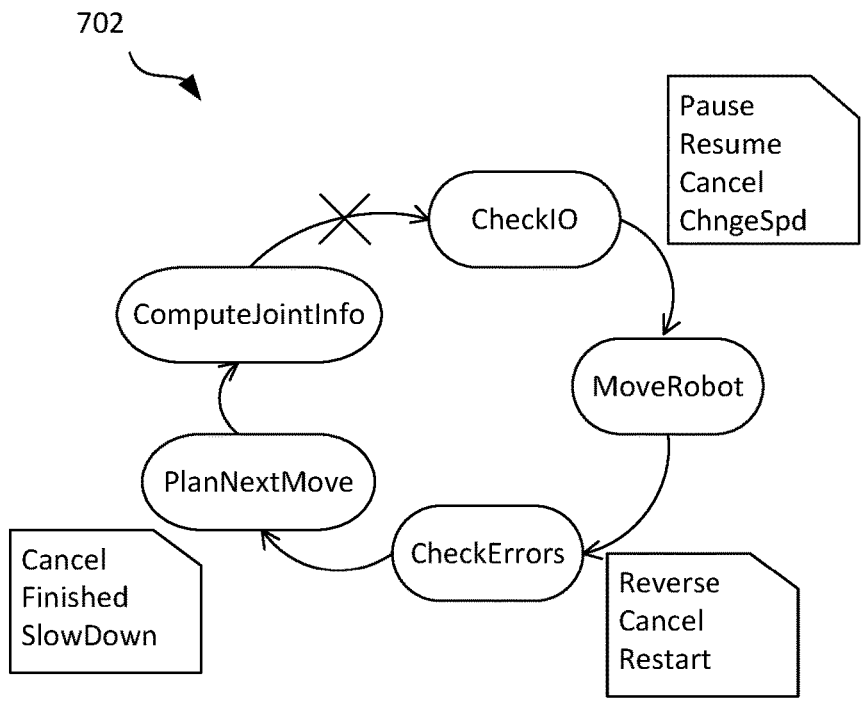
FIG. 7A-FIG. 7D are illustrations of example adjustment mechanisms in accordance with one or more embodiments of the present technology.

FIG. 7A-FIG. 7G are illustrations of example adjustment mechanisms (e.g., state machines) in accordance with one or more embodiments of the present technology. FIG. 7A illustrates a trajectory execution mechanism 702 (e.g., the bridge circuit 304 of FIG. 3, one or more of the processors 202 of FIG. 2, or a combination thereof). The trajectory execution mechanism 702 can be configured to oversee an overall flow for adjusting the implementation of the planned trajectory 322 of FIG. 3. The trajectory execution mechanism 702 can correspond to the method 600 of FIG. 6, a portion thereof, or an alternative embodiment.

The trajectory execution mechanism 702 can be implemented according to the processing period 404 of FIG. 4. The trajectory execution mechanism 702 can transition through various states described below for each processing period that begins and ends at 'X'.

For each period or tick, the trajectory execution mechanism 702 can check the I/O state 344 of FIG. 3 as represented by the "CheckIO" block. The trajectory execution mechanism 702 can check the I/O state 344 or changes thereto as described above for block 616 of FIG. 6. For example, the trajectory execution mechanism 702 can detect the occurrence or a change to a Pause state, a Resume state, a Cancel state, a Change Speed state, etc.

After checking the I/O, the trajectory execution mechanism 702 can move the robot as represented by the "MoveRobot" block. The trajectory execution mechanism 702 can operate the robot 306 of FIG. 3 according to the currently maintained trajectory, such as the planned trajectory 322 of FIG. 3 with the planned waypoints 402 of FIG. 4 or the adjustment 520 of FIG. 5B with the updated waypoints 532 of FIG. 5B. For example, the trajectory execution mechanism 702 can correspond to the processes described above for block 614 of FIG. 6.

In some embodiments, the trajectory execution mechanism 702 can check for errors (e.g., the error state 346 of FIG. 3) as represented by the "CheckErrors" block. The trajectory execution mechanism 702 can check for the error state 346, similarly as described above for block 616. In other words, the trajectory execution mechanism 702 can split the monitoring of real-world conditions such that a portion of the conditions (e.g., the I/O states 344) are checked before/during movement and errors are checked after the movement. For example, the trajectory execution mechanism 702 can check for errors by as an evaluation of the implemented movement. Some examples of the evaluated error conditions can include unexpected/unplanned contact between the target object 112 and/or the represented portion with another object or structure, dropping of the target object ("piece-loss"), one or more predetermined cancelling conditions (e.g., shifting of objects at the target location), mismatching sensor vales, and the like. The trajectory execution mechanism 702 can use a predetermined process to determine a response action that corresponds to the detected error. The response action can include reversing movement, cancelling the task, restarting the task, etc.

Subsequently, the trajectory execution mechanism 702 can determine the next movement as represented by the "PlanNextMove" block. The trajectory execution mechanism 702 can plan the next movement similarly as described above for blocks 612, 618, and 620 of FIG. 6. For example, the trajectory execution mechanism 702 can determine whether the I/O state 344 and/or the error state 346 has been flagged or detected in the preceding steps. The planned next move can correspond to continuing with the existing plan when no triggering conditions have been detected. If one or more triggering conditions have been detected, the trajectory execution mechanism 702 can determine the next move to be cancelling the task implementation, finishing the task implementation, and/or slowing down the movement.

The trajectory execution mechanism 702 can compute joint information (e.g., details for implementing the next movement) according to the planned next move. If no triggering conditions have been detected, the trajectory execution mechanism 702 can derive the next movement based on identifying the next waypoint and the corresponding movement speed according to the remaining/existing set of waypoints. If one or more triggering conditions have been detected, the trajectory execution mechanism 702 can initiate the trajectory adjuster 305 of FIG. 3. The trajectory adjuster 305 can correspond to block 620 and dynamically derive details for the task adjustment (e.g., the updated waypoints 532 of FIG. 5B) that deviate from the remaining/existing waypoints. For example, the trajectory adjuster 305 can determine a new target speed and/or a corresponding set of intermediate speeds that correspond to the planned next move. In some embodiments, the trajectory adjuster 305 and/or the motion planner circuit 302 of FIG. 3 can rederive the trajectory based on the triggering conditions.

Figure 7B:
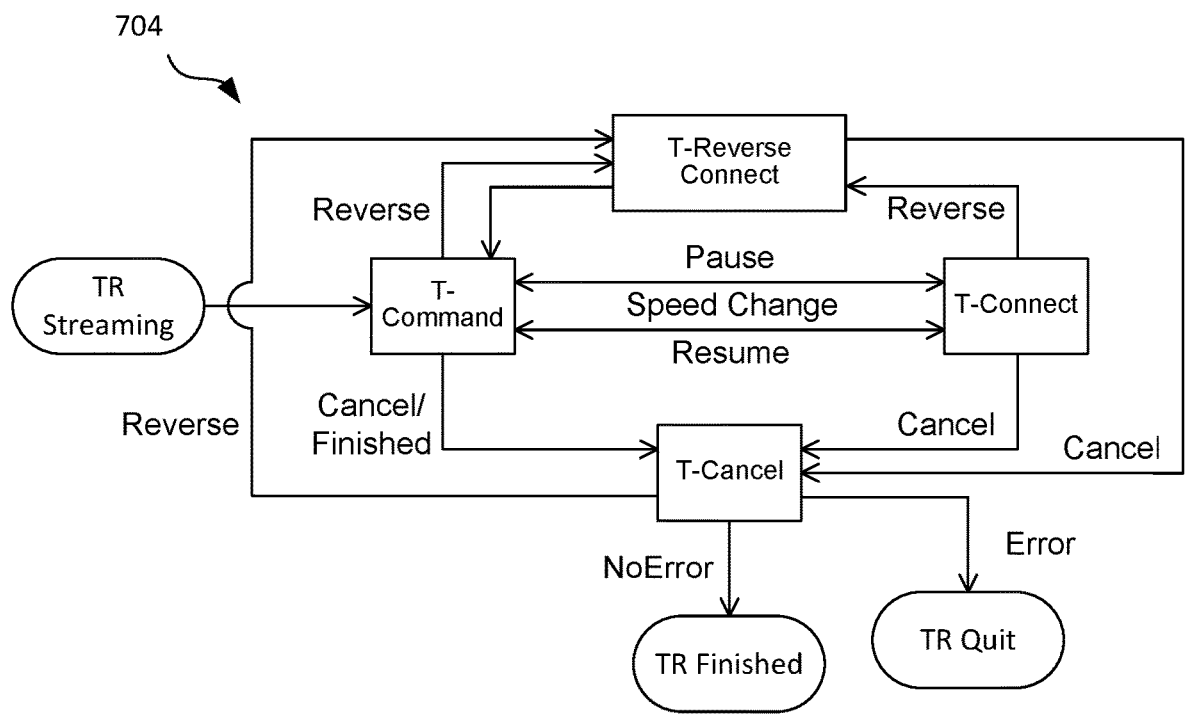

FIG. 7B illustrates an example command flow 704 (e.g., state machine flow) for the trajectory execution mechanism 702 of FIG. 7A. The flow 704 can represent various command states and transitions between the command states for the bridge circuit 304 of FIG. 3. In other words, the flow 704 can represent the commands/actions that can be implemented at the robot 306 of FIG. 3 and the transitions between the implementation states.

The flow 704 can include a TR Streaming state that represents communication of data and/or commands to the bridge circuit 304. Based on the TR Streaming state, the flow 704 can represent a flow between different trajectory types. In some embodiments, the trajectory types can include T-Command, T-Connect, T-Cancel, and/or T-Reverse Connect.

The T-Command type can be configured to input trajectory. For example, the bridge circuit 304 of FIG. 3 can receive the planned trajectory 322 of FIG. 3 as illustrated in block 602 of FIG. 6. The T-Command type can correspond to the initially planned trajectory 322 of FIG. 3 that is derived by the trajectory adjuster 305 FIG. 3. The bridge circuit 304 can continue to execute the planned trajectory 322 as initially derived for the T-Command type.

The flow 704 can transition to a different trajectory type or state in response to the real-time conditions (e.g., the I/O state 344 of FIG. 3 and/or the error state 346 of FIG. 3). For example, determination of Pause, Resume, and/or Speed Change conditions can cause trajectory adjuster 305 to transition from T-Command to T-Connect. The T-Connect type of trajectory can include the adjustment 520 of FIG. 5B. The T-Connect can correspond to deceleration command to 0 speed for Pause condition and acceleration command to previous or ongoing speed for Resume condition. For Speed Change condition, the trajectory adjuster 305 can compute an implementation plan for accelerating/decelerating the representative portion of the robot 306. In some embodiments, the implementation plan can include a current travel speed multiplier (CTSM) configured to guide the speed change for each iteration until the target speed. The implementation plan may further include an external travel speed multiplier (ETSM) received from another device/system. In some embodiments, the updates can be stored as the existing/ongoing trajectory, and the flow 704 can transition back from T-Connect to T-Command for subsequent implementation of the updated trajectory.

The T-Cancel type can be for cancelling the trajectory implementation. The T-Cancel trajectory type can be generated in response to and/or during a detected error condition (e.g., the error state 346 of FIG. 3). The T-Cancel trajectory type can correspond to one or more commands for stopping to 0 speed. In some embodiments, the T-Cancel type can correspond to finishing/completing the task. For example, when the robot 306 finishes manipulation of the target object 112 (by, e.g., placement at the task location 116), the T-Cancel type can be generated to remove the completed planned trajectory 322 from the processing flow before beginning a new task. Accordingly, the flow 704 can enter TR Finished state when the T-Cancel is without any errors or triggering conditions. Alternatively, for one or more predetermined triggering conditions, the T-Cancel can clear the problematic planned trajectory 322 before transitioning to a TR Quit stage for irrecoverable error conditions (e.g., piece loss).

The T-Reverse Connect type of trajectory can correspond to one or more predetermined error conditions. For example, the T-Reverse Connect can be generated in response to the robot 306 hits or disturbs one or more objects during transfer movement and/or during a picking/placement operation. Also, the T-Reverse Connect can be generated when the planned position of the robot 306 (e.g., a pose of the end-effector) does not match a detected position of the robot 306.

Figure 7C:
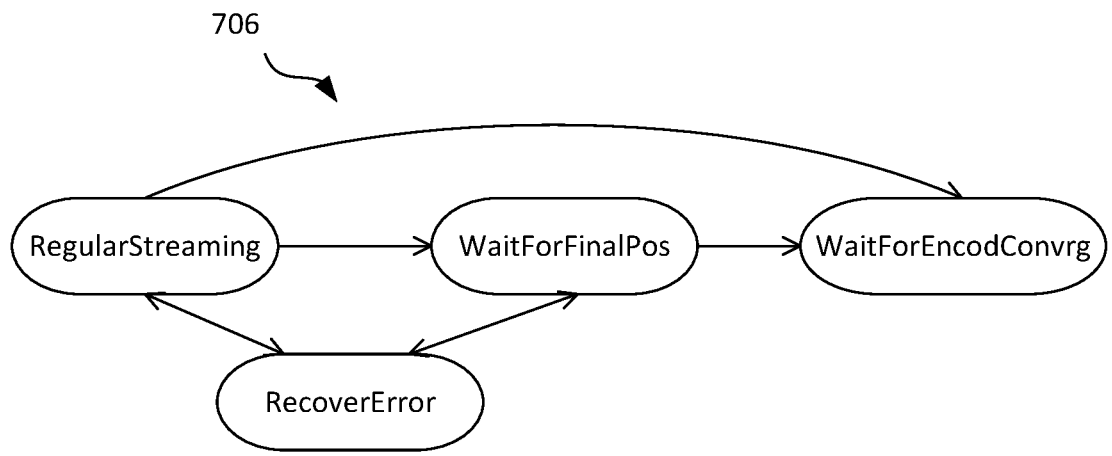

FIG. 7C illustrates an example execution flow 706 for the trajectory execution mechanism 702 of FIG. 7A. The execution flow 706 can represent different states and transitions for each of the trajectory types described above (e.g., in FIG. 7B). For each command/action, a regular streaming state (RegularStreaming) can represent the robotic system 100 of FIG. 1 (via, e.g., the bridge circuit 304 of FIG. 3 and the robot 306 of FIG. 3) following the current set of waypoints (e.g., the planned waypoints 402 of FIG. 4 initially and the updated waypoints 532 of FIG. 5B following the adjustment 520 of FIG. 5B).

The robotic system 100 can account for delays or lags associated with communication between the bridge circuit 304 and the robot 306 and the corresponding processing times. For example, the bridge circuit 304 and/or the robot 306 can implement a state to wait for final position (WaitForFinalPos) and wait until the robot executes the commanded action. The final position of the robot 306 can be obtained by the bridge circuit 304 by the end of the action. The robot 306 can send the feedback data 362 of FIG. 3 that reports the final position to end the waiting state. Alternatively or additionally, the bridge circuit 304 can compute the final position based on the commanded action and/or the feedback data 362 (e.g., completion status report) to end the waiting state.

In some embodiments, the robotic system 100 can include error recovery mechanisms configured to respond to predetermined error conditions. For example, the error recovery mechanisms can correspond to automatically reversing the movement (e.g., T-Reverse Connect of FIG. 7B) as described above. The robotic system 100 can transition to the error recovery mechanism from the regular streaming state and/or from the waiting state. The robotic system 100 can transition back to the regular streaming state and/or the waiting state from the error recovery state.

The robotic system 100 can further account for encoder or processing delay at the robot 306. For example, the bridge circuit 304 and/or the robot 306 can implement a state to wait for the processing delay or convergence at the encoder (WaitForEncodConvrg). The encoder of the robot 306 may stop after the robot 306 reaches the final targeted location at the end of the movement.

The robot 306 can arrive at the final position of based on following the trajectory to its end. If the robotic system 100 determines an error condition along the trajectory before arrival at the end, the bridge circuit 304 can stop movement of the robot 306. In response to the error, the bridge circuit 304 can withhold the command associated with the final position. The execution flow 706 can transition directly to the convergence waiting state from the regular streaming state.

The robotic system 100 can stop the robot 306 and exit the state machine, the bridge circuit 304 can wait for the encoder convergence to ensure that the robot 306 is at or within a predetermine distance from the designated position. Once the robot 306 stops, the robotic system 100 can use the stopping point to recompute the next trajectory.

Figure 7D:
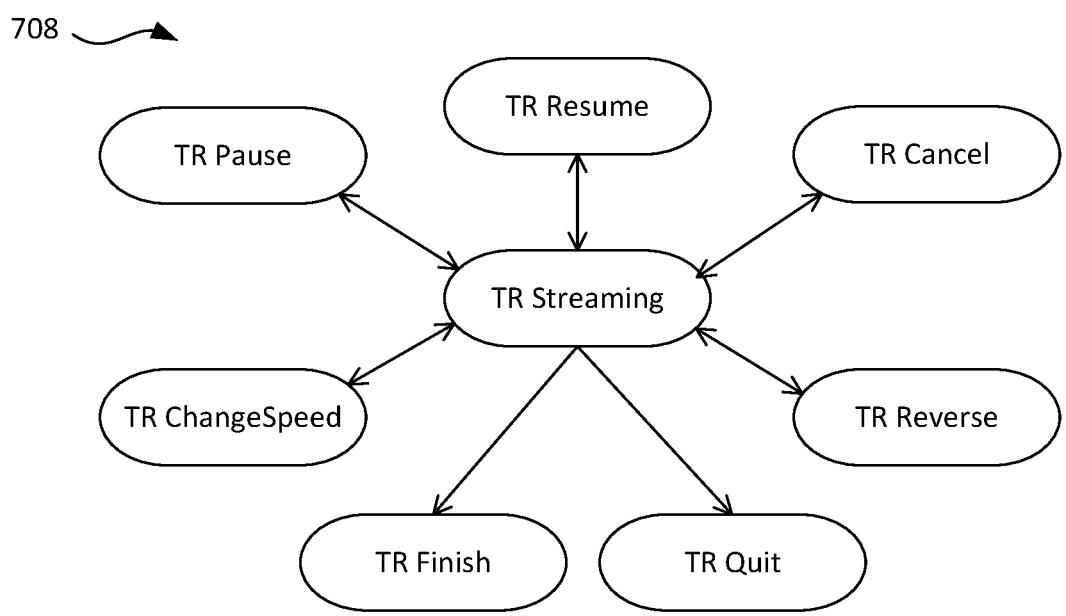

FIG. 7D illustrates an example trajectory flow 708 for the trajectory execution mechanism 702 of FIG. 7A. The trajectory flow 708 can illustrate a relationship between different trajectory transitions. The trajectory flow 708 can determine the transitions before deciding trajectory type to targeted by the transition. Accordingly, the robotic system 100 of FIG. 1 can prioritize the which event should be followed and provide hierarchy between different transitions. The different state transitions can be used to make different kinds of decisions for commuting or selecting the transition.

The trajectory flow 708 can correspond to the states described above for the command flow 704 of FIG. 7B. For example, the TR Streaming State in FIG. 7D can correspond to the TR Streaming state and the T-Command state of FIG. 7B. TR-Pause, TR-Resume, TR Cancel, TR Change Speed, and TR Reverse can correspond to the transition triggers described in FIG. 7B. TR Finished state can correspond to transition (e.g., arrival at the finish location without errors during manipulation) to the TR Finished state of FIG. 7B.

The robotic system 100 can use the dynamic adjustment 520 to smoothly and seamless account for real-world conditions. Since time and resources required to rederive the trajectory using the motion planner circuit 302 of FIG. 3 is relatively extensive, the robotic system 100 can use the bridge circuit 304 to dynamically derive the updated waypoints 532 along the initially planned trajectory 322. For example, immediately stopping or reversing movement of the robot 306 in response to the real-world conditions may cause the robot 306 to jerk or shake, which can increase the likelihood of causing further undesired errors. Alternatively, continually implementing the initially planned trajectory despite the real-world conditions (e.g., errors) can cause additional errors (e.g., collisions) and/or waste resources (e.g., subsequent to piece loss). As such, by replacing the planned waypoints 404 with the updated waypoints 532, the robotic system 100 can practically implement dynamic adjustments while increasing overall efficiencies and error rates. Moreover, the robotic system 100 as described above (via, e.g., the method 600 of FIG. 6 and/or the example state machines) can practically implement the task while accounting and adjusting for real-world conditions.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:

receiving a planned trajectory for manipulating a target object;

identifying a set of planned waypoints along the planned trajectory, wherein each waypoint in the set of planned waypoints represents an incrementally-targeted location on the planned trajectory for placing the target object or a representative portion of a robot according to a processing period;

initiating implementation of a task according to the planned trajectory by communicating a set of commands or settings for operating the robot to have the target object or the representative portion of the robot to follow the planned trajectory;

iteratively implementing the task for transferring the target object or the representative portion of the robot to a subsequent planned waypoint on the planned trajectory;

monitoring an input/output (I/O) state during iterative implementation of the planned trajectory, wherein the I/O state represents a capacity to complete implementation of the task and manipulating the target object;

based on the I/O state, dynamically deriving a set of updated waypoints for representing, according to the processing period, a changed set of locations traversed by the robot corresponding to a change in speed, the set of updated waypoints configured to replace the set of planned waypoints, wherein the set of updated waypoints and the set of planned waypoints correspond to different locations on the same planned trajectory; and based on the I/O state, implementing an adjustment to the task for transferring the target object or the representative portion of the robot according to the set of updated waypoints instead of following the set of planned waypoints.

2. The method of claim 1, wherein:

monitoring the I/O state includes detecting a pause state, a resume state, a cancel state, a speed change state, and/or an error state during implementation of the task, wherein the pause state, the resume state, the cancel state, the speed change state, and/or the error state represent a real-time real-world condition associated with the capacity of the robotic system to complete the task; and dynamically deriving the set of updated waypoints and iteratively implementing the adjustment to the task are performed in response to detecting the pause state, the resume state, the cancel state, the speed change state, and/or the error state.

3. The method of claim 1, wherein:

dynamically deriving the set of updated waypoints includes determining a target movement speed different from a planned movement speed associated with the set of planned waypoints; and implementing the adjustment to the task includes transitioning to the target movement speed across one or more waypoint in the set of updated waypoints.

4. The method of claim 3, wherein:

the set of updated waypoints and the set of planned waypoints correspond to a processing period, wherein each waypoint in the set of updated waypoints and the set of planned waypoints represent a targeted location to be reached by the target object or the representative portion of the robot at an end of the processing period;

dynamically deriving the set of updated waypoints includes determining an intermediate movement speed between a current speed and the targeted movement speed; and implementing the adjustment to the task includes iteratively transitioning to the target movement speed by:
    transitioning to the intermediate movement speed during an initial processing period; and
    transitioning to the targeted movement speed during a subsequent processing period following the initial processing period.

5. The method of claim 3, wherein implementing the adjustment to the task includes transitioning to the target movement speed for stopping movement of the target object and/or the representative portion of the robot.

6. The method of claim 3, wherein implementing the adjustment to the task includes transitioning to the target movement speed for reversing movement of the target object and/or the representative portion of the robot.

7. The method of claim 1, wherein dynamically deriving the set of updated waypoints includes determining a feasibility region along the planned trajectory and ahead of a current location representative of the target object and/or the representative portion of the robot, wherein the feasibility region is for representing locations along the planned trajectory where the adjustment is first available to take effect.

8. The method of claim 7, wherein the feasibility region is determined according to a response profile that is representative of a physical capacity of the robot to execute the adjustment to the task or a portion thereof.

9. The method of claim 8, wherein:
    the feasibility region is determined based on mapping the response profile from the current location; and
    the set of updated waypoints includes a first waypoint located within the feasibility region.

10. The method of claim 9, wherein:
    the feasibility region is defined by (1) a maximum negative change in velocity for a processing period and (2) a maximum positive change in velocity for the processing period; and
    the first waypoint is derived based on a difference between a second upcoming position and a first upcoming position evaluated over the processing period.

11. A robotic system comprising:
    a communication device configured to:
        receive a planned trajectory from a motion planner circuit, wherein the planned trajectory is for implementing a task to transfer a target object from a start location to a task location, and
        communicate commands, settings, and/or feedback data with a robot for implementing the planned trajectory; and
    at least one processor coupled to the communication device, the at least one processor for:
        identifying a set of planned waypoints along the planned trajectory, wherein each waypoint in the set of planned waypoints represents an incrementally-targeted location on the planned trajectory for placing the target object or a representative portion of a robot according to a processing period;
        initiating implementation of the task according to the planned trajectory based on an initial set of commands and/or settings communicated to the robot;
        iteratively implementing the task for transferring the target object or the representative portion of the robot to a subsequent planned waypoint on the planned trajectory;
        monitoring an input/output (I/O) state during iterative implementation of the planned trajectory, wherein the I/O state represents a capacity to complete implementation of the task and manipulating the target object;
        based on the I/O state, dynamically deriving a set of updated waypoints for representing, according to the processing period, a changed set of locations traversed by the robot caused by a change in speed, the set of updated waypoints configured to replace the set of planned waypoints, wherein the set of updated waypoints and the set of planned waypoints correspond to different locations on the same planned trajectory;
        based on the I/O state, implementing an adjustment to the task for transferring the target object or the representative portion of the robot according to the set of updated waypoints instead of following the set of planned waypoints, wherein the adjustment to the task corresponds to a subsequent set of commands and/or settings communicated to the robot.

12. The robotic system of claim 11, further comprising:
    the planner circuit configured to derive the planned trajectory; and
    the robot configured to execute the task according to the planned trajectory and/or the adjustment to the task, wherein:
    the communication device with the at least one processor comprise a bridge circuit configured to control the robot to implement execution of the task, wherein the bridge circuit is communicatively coupled between the planner circuit and the robot.

13. The robotic system of claim 11, wherein the at least one processor includes one or more state machines configured to control execution of the task based on identifying the set of planned waypoints, initiating implementation of the task, iteratively implementing the task, monitoring the I/O state, dynamically deriving the set of updated waypoints, and/or implementing the adjustment to the task.

14. The robotic system of claim 11, wherein:
    the monitored I/O state includes a pause state, a resume state, a cancel state, a speed change state, and/or an error state that represent a real-time real-world condition associated with the capacity of the robotic system to complete the task; and
    the set of updated waypoints and the adjustment to the task are dynamically derived and dynamically implemented, respectively, in response to detecting the pause state, the resume state, the cancel state, the speed change state, and/or the error state or a change thereof.

15. The robotic system of claim 11, wherein the at least one processor is for:
    dynamically deriving the set of updated waypoints based on determining a target movement speed different from a planned movement speed associated with the set of planned waypoints; and
    implementing the adjustment to the task based on transitioning from a current speed to the target movement speed across one or more waypoint in the set of updated waypoints.

16. The robotic system of claim 11, wherein the at least one processor is for dynamically deriving the set of updated waypoints based on determining a feasibility region along the planned trajectory and ahead of a current location representative of the target object and/or the representative portion of the robot, wherein the feasibility region is for representing locations along the planned trajectory where the adjustment to the task is first available to take effect.

17. A tangible, non-transient computer-readable medium having processor instructions stored thereon that, when executed by one or more processors, cause the one or more processors to perform a method, the method comprising:
  receiving a planned trajectory for manipulating a target object;
  identifying a set of planned waypoints along the planned trajectory, wherein each planned waypoint represents an incrementally-targeted location on the planned trajectory for placing the target object or a representative portion of a robot according to a processing period;
  initiating implementation of a task according to the planned trajectory by communicating a set of commands or settings for operating the robot to have the target object or the representative portion of the robot to follow the planned trajectory;
  iteratively implementing the task for transferring the target object or the representative portion of the robot to a subsequent planned waypoint on the planned trajectory;
  monitoring an input/output (I/O) state during iterative implementation of the task, wherein the I/O state represents a capacity to complete the task implementation and manipulate the target object;
  based on the I/O state, dynamically deriving a set of updated waypoints for representing, according to the processing period, a changed set of locations traversed by the robot caused by a change in speed, the set of updated waypoints configured to replace the set of planned waypoints, wherein the set of updated waypoints and the set of planned waypoints correspond to different locations on the same planned trajectory; and
  based on the I/O state, implementing an adjustment to the task for transferring the target object or the representative portion of the robot according to the set of updated waypoints instead of following the set of planned waypoints.

18. The tangible, non-transient computer-readable medium of claim 17, wherein:
  monitoring the I/O state includes detecting a pause state, a resume state, a cancel state, a speed change state, and/or an error state during implementation of the task, wherein the pause state, the resume state, the cancel state, the speed change state, and/or the error state represent a real-time real-world condition associated with the capacity of the robot to complete the task; and
  dynamically deriving the set of updated waypoints and iteratively implementing the adjustment to the task are performed in response to detecting the pause state, the resume state, the cancel state, the speed change state, and/or the error state.

19. The tangible, non-transient computer-readable medium of claim 17, wherein:
  dynamically deriving the set of updated waypoints includes determining a target movement speed different from a planned movement speed associated with the set of planned waypoints; and
  implementing the adjustment to the task includes transitioning to the target movement speed across one or more waypoint in the set of updated waypoints.

20. The tangible, non-transient computer-readable medium of claim 17, wherein dynamically deriving the set of updated waypoints includes determining a feasibility region along the planned trajectory and ahead of a current location representative of the target object and/or the representative portion of the robot, wherein the feasibility region is for representing locations along the planned trajectory where the adjustment to the task is first available to take effect.

* * * * *